3,181,973
FUEL CELL ELECTRODE AND METHOD OF MAKING THE SAME
Joseph C. Duddy, Trevose, Pa., assignor to The Electric Storage Battery Company, a corporation of New Jersey
No Drawing. Filed Dec. 28, 1960, Ser. No. 78,833
11 Claims. (Cl. 136—120)

The present invention generally relates to new and improved electrodes for the direct production of electrical energy from fuels by electrochemical means and to methods for making the same. More specifically, the present invention is concerned with a new and improved electrode of the type utilizing palladium as a catalytic constituent.

In my co-pending applications, Serial Nos. 818,638 and 818,766, both now abandoned, there is disclosed a method for making electrodes in which a first thermoplastic resin, soluble in a given solvent, and a second thermoplastic resin, incompatible with the first thermoplastic resin and insoluble in the given solvent, are intimately mixed under heat and pressure to produce a plasticized mass. After the plasticization and intensive mixing of the two resins, there is added to the plasticized mass the electrode material in powdered form for the particular type of electrode to be produced. After a time interval adequate for the thorough and homogeneous mixing of the powdered electrode material and the thermoplastic resins, the mixture is shaped as by calendering or extruding to produce material suitable for electrode application. After the shaping of the material and such other treatment as is required to produce the electrode, the soluble resin is leached therefrom by means of a bath in a suitable solvent leaving the electrode material bound in a permanent microporous matrix of the insoluble thermoplastic resin.

In these co-pending applications the following resins are disclosed as being suitable for utilization as the insoluble resin phase: polyethylene, polypropylene, polystyrene, and polyvinyl chloride. The following water soluble thermoplastic resins are disclosed as being suitable for use as the soluble or temporary thermoplastic phase: polyethylene oxide, polyethylene glycol, and polyvinyl pyrrolidone.

As a result of the incompatibility of the thermoplastic resins utilized in the present invention and the intimate mixing and blending thereof, there is produced a thermoplastic material having a plurality of interconnected thread-like pores of capillary size upon the removal of the soluble resin phase. The pores thus formed are uniformly distributed throughout the permanent binder, oriented with respect to the permanent binder and generally of a size much less than the particle size of the active material utilized. Measurements have shown that the pores developed by the removal of the soluble resin phase are generally less than one micron in size. As a consequence of the microporosity thus developed and the resiliency of the permanent binder utilized, the electrodes swell when placed in the leaching solvent. This swelling can be attributed to the capillary expansion of the porous matrix, providing for more pore formation and extremely efficient utilization of the active material.

Catalytically active surface area is an important factor in controlling electrode performance. One means of achieving a maximum catalytic surface area in an electrode is to utilize catalytic materials having the finest available particle size and to preserve this particle size during the processing of the electrode. Palladium has heretofore been utilized as a catalytic element for increasing the efficiency of fuel electrodes in electrochemical fuel cell systems. With respect to the utilization of metallic palladium in fuel cell electrodes, it is proposed to utilize palladium oxide as a starting material for the production of fuel electrodes inasmuch as that oxide is available commercially in a much finer particle size than is the metal itself. Palladium oxide is in fact available commercially in a fineness which may be best characterized as impalpable. When palladium oxide is utilized in electrodes manufactured in accordance with the teaching of the foregoing co-pending applications, however, it has been found that the interstitial pores created therein by the removal of the water soluble resinous phase, even though they are of an average dimension of less than one micron, are not sufficiently small to impede the removal therewith of the palladium oxide particles which are small enough to become colloidally suspended in the leaching water and lost from the electrode. This situation is particularly unfortunate inasmuch as the extremely fine particles which diffuse through the interstitial network and so become lost are the particles which, because of their extremely fine size, are the most catalytically active.

It is therefore an object of the present invention to provide a means for preventing the removal of such particles of palladium oxide from the resinous network described and in so doing to provide a fuel electrode characterized by electrochemical efficiencies of an extremely high order.

The essence of the present invention is associated with the unique pH characteristics of one of the water soluble resin phases specified in the aforementioned co-pending applications. This resin, polyethylene oxide, is readily and completely soluble in solutions having a pH in the area of neutrality; however, in increasingly acid or alkaline aqueous solutions it becomes increasingly less soluble. The insolubility of polyethylene oxide in alkaline solutions is characterized by the formation of a gel attended by the swelling of the resins caused by the absorption of the alkaline solution. In this gelled state the solvated resin is capable of supporting ionic conductivity by virtue of the absorbed solution. In addition, in strongly alkaline solutions of the type utilized for fuel cell electrolytes the gel formed by this resin and the alkaline solution is not physically gelatinous in nature, but is semi-resinous in nature. The present invention is characterized by the utilization of these unique properties of polyethylene oxide to immobilize within the pores of a fuel cell electrode minute particles of palladium oxide until they are reduced to metallic palladium to provide a fuel cell electrode characterized by moderate cost and high efficiency.

Other objects and advantages of the present invention will be apparent from the following detailed description of preferred embodiments thereof.

In carrying out one form of the present invention a fuel cell electrode is produced by intimately mixing under heat and pressure 1.0 part by weight of polyethylene oxide and 1.0 part by weight of an insoluble thermoplastic resin such as polyethylene to produce a plasticized mass. The intimate mixing of the two resins may be accomplished in an intensive mixer or an extruder, but preferably is accomplished on a two-roll rubber mill in which the rolls are operated at differential speeds. A temperature of about 275° F. has been found applicable for plasticizing the two resins. After the plasticization and intimate admixing of the two resins has been accomplished there is added to the plasticized mass on the mill 16 parts by weight of finely divided silver powder and 1.7 parts by weight of impalpable palladium oxide. After a time interval adequate for the thorough and intimate mixing of the powdered silver and palladium oxide into the thermoplastic resins, the mixture was removed from the mill and pelletized at room temperature for subsequent shaping as by calendering or extruding.

Those skilled in the art will understand how to select the time required for plasticizing the thermoplastic resins and also the time required to produce the intimate mixing described above. When the mixing of these materials is accomplished on a two-roll mill, a time order of about two to three minutes is satisfactory for plasticizing and mixing the resins and a time on the order of about seven minutes is satisfactory for the mixing of the powdered metals into the plasticized resins.

The pelletized mixture of thermoplastic resins and electrode materials is next fed to an extruder and extruded as a $3/16''$ diameter rod onto a $1/32''$ diameter silver wire which serves as a conductive core. For this purpose, a temperature of about 225° F. has been found to be a satisfactory temperature for extruder operation.

Following the shaping of the electrode, the palladium oxide therein is electrochemically converted to palladium in a dilute solution of potassium hydroxide against a suitable electrode. For this purpose, a 7% solution of potassium hydroxide may be utilized and the palladium oxide electrolyzed cathodically against a nickel electrode and converted to palladium. Because of the dilute nature of the alkaline electrolyte utilized, the polyethylene oxide phase of the electrode readily absorbed the electrolyte and swelled to form a gel therewith in situ. By virtue of the absorbed electrolyte this gel was capable of supporting the ionic conductivity necessary for the reduction of the palladium oxide to palladium. It should also be noted that the in situ swelling of the water soluble resin phase was accommodated by the resiliency of the insoluble resin phase of the binder utilized.

Following the reduction of the palladium oxide component of the electrode to palladium the electrode was ready for utilization. The particular electrode described was adapted for use as a fuel electrode for the production of electrical energy from a liquid fuel, such as alcohols, ketones, end ethers, which are miscible in the electrolyte. By way of example, this electrode was operated successfully as the fuel element in an alcohol-oxide fuel cell system. The electrolyte utilized comprised 10 parts by weight of ethyl alcohol and 90 parts by weight of a 27% solution of potassium hydroxide. At a current density of about 40 amperes per sq. ft. at room temperature, the polarization of the electrode was only 420 millivolts. It should be understood, however, that in a different physical configuration such an electrode would be applicable for use in fuel cell systems other than those in which a liquid fuel is mixed with the electrolyte. Thus, a fuel cell electrode in accordance with the present invention is suitable for use as a gas electrode where the gas is applied in countercurrent relationship to electrolyte penetration.

In accordance with the present invention the palladium oxide also can be chemically reduced by immersion of the electrode in a suitable reducing agent. For such treatment the soluble resin phase must be partly solvated in order to develop the porosity necessary to facilitate penetration of the reducing agent. By way of illustration, the electrode after shaping can be immersed in a solution of alcohol and potassium hydroxide. Since the electrode swells with the absorption of the potassium hydroxide by the soluble resin phase, to form a gel, porosity is developed which permits the reduction of the palladium. Another method which has been found applicable for treating an electrode in accordance with the present invention is to partly leach the water soluble resin phase from the electrode in a water bath. While the time interval necessary for such treatment is primarily determined by the physical configuration of the electrode it should be understood that the leaching process must only be carried out partly to avoid undue loss of palladium oxide from the electrode. For an electrode of the type described hereinbefore, a soaking for a time on the order of 10 minutes was found applicable. Following the soaking of the electrode in water, the electrode may be transferred to an alkaline solution and the metallic palladium converted to palladium oxide electrolytically. It should be noted that following the reduction of the palladium oxide to the metal, the complete removal of the soluble resin phase from the electrode can be accomplished in a water bath without loss of the palladium from the electrode. While the mechanism which prevents the loss of the palladium from an electrode in the water leaching bath, but permits the loss of palladium oxide from an electrode under the same conditions is not fully understood, it is believed attributable to the different surface charge characteristics of the oxide and the metal. Accordingly, once the metallic palladium has been converted to the metal where desirable, the soluble resin phase can be removed entirely from the electrode leaving the metallic palladium deposited within the pores of the electrode.

The teachings of the present invention are applicable to electrode incorporating materials other than silver. Thus, other fuel cell electrode materials such as silver and nickel, nickel, copper, and graphite can be used in combination with palladium oxide. The porosity of electrodes made in accordance with the present invention can be controlled by varying the amount of the soluble resin phase utilized with respect to the insoluble resin phase utilized. It has been found that optimum electrode performance is achieved where the soluble thermoplastic resin is present in amounts varying from approximately ⅓ the amount of the insoluble resin to three times the amount of the insoluble resin. It should be understood that the specific electrode formulation cited hereinbefore is by way of example only and is not necessarily that which provides optimum electrode performance. While polyethylene has been cited as an example as a resin suitable for use as the insoluble resin phase, it should be understood that polypropylene, polystyrene, polyvinyl chloride, and other thermoplastic resins which are insoluble in water and electrolytes, incompatible with the polyethylene oxide, and which can be plasticized at temperatures which will not degrade the water soluble resin phase or the electrode material, will be suitable. By incompatible is meant that the two resins will exist as separate and distinct phases in the plasticized state.

The amount of electrode material with which the thermoplastic binders can be loaded depends primarily upon the particle size of the electrode material utilized. As a general rule, it has been found that the amount of loading which can be achieved will increase as the size of the electrode material particles increase. In this respect however, it should be noted that for fuel cell electrode applications, increased loading does not necessarily increase electrode performance since electrode performance is governed primarily by the catalytic characteristics of the electrode material utilized and the availability of that material for providing sites at the fuel electrolyte interface for the cell reaction. The present invention provides a means for making available palladium derived from palladium oxide as the catalytic element in fuel cell electrodes made by the manufacturing method which utilizes a water soluble resin phase in combination with an insoluble resin phase.

Having described the present invention that which is claimed as new is:

1. A method of manufacturing a fuel cell electrode which comprises intimately and homogeneously mixing a plasticized thermoplastic resin, plasticized polyethylene oxide in a ratio based upon parts by weight of said thermoplastic resin of between 1–3 and 3–1, a powdered electrically conductive electrode material selected from the group consisting of silver, nickel, mixtures of silver and nickel, copper, and graphite in an amount sufficient to be dispersed in a continuous phase throughout said intimately mixed thermoplastic resin and palladium oxide to produce a plasticized mass, said thermoplastic resin being insoluble in said polyethylene oxide and alkaline electrolytes, shaping said mass to produce a fuel cell electrode, and converting said palladium oxide to metallic palladium in an alkaline electrolyte.

2. Method of claim 1 wherein said palladium oxide is electrochemically converted to palladium.

3. Method of claim 1 wherein said palladium oxide is chemically reduced to palladium by means of a reducing agent dissolved in said alkaline electrolyte.

4. A method of manufacturing a fuel cell electrode which comprises intimately and homogeneously mixing under heat and pressure a plasticized first thermoplastic resin, plasticized polyethylene oxide in a ratio based upon parts by weight of said first thermoplastic resin of between 1–3 and 3–1, a powdered electrically conductive electrode material selected from the group consisting of silver, nickel, mixtures of silver and nickel, copper, and graphite in an amount sufficient to be dispersed in a continuous phase throughout said intimately mixed thermoplastic resin and polyethylene oxide and palladium oxide to produce a plasticized mass, said mixing being carried out at a temperature sufficient to plasticize said resin and said polyethylene oxide and insufficient to degrade said electrode material and said palladium oxide, said thermoplastic resin being insoluble in said polyethylene oxide, water, and alkaline electrolytes, shaping said mass to produce a fuel cell electrode, subjecting said electrode to a water bath to partially remove said polyethylene oxide from said electrode, and converting said palladium oxide to metallic palladium in an alkaline electrolyte.

5. Method of claim 4 wherein said electrode is subjected to a further water bath following the conversion of said palladium oxide to palladium to substantially remove said polyethylene oxide from said electrode.

6. A fuel cell electrode comprising a porous conductive matrix of electrode material dispersed in a continuous phase throughout a thermoplastic resin, said electrode material being selected from the group consisting of silver, nickel, mixtures of silver and nickel, copper, and graphite, an ionically conductive gel in the pores of said electrode and palladium entrapped in said gel.

7. A fuel cell electrode for utilization in alkaline electrolytes comprising a conductive electrode material selected from the group consisting of silver, mixtures of silver and nickel, nickel, copper, and graphite uniformly dispersed throughout a porous matrix of a thermoplastic resin insoluble in water and alkaline electrolytes and having in the pores thereof a gel comprising a polyethylene oxide and said alkaline electrolyte and metallic palladium entrapped in said gel.

8. Fuel cell electrode as specified in claim 7 wherein said conductive electrode material comprises metallic silver.

9. Fuel cell electrode as specified in claim 7 wherein said thermoplastic resin comprises polyethylene.

10. Method of manufacturing a fuel cell electrode which comprises intimately mixing under heat and pressure one part by weight of polyethylene and one part by weight of polyethylene oxide to produce a plasticized mass, intimately mixing into said plasticized mass 16 parts by weight of finely divided silver powder and 1.7 parts by weight of palladium oxide, said mixing being carried out at a temperature sufficient to plasticize said polyethylene and said polyethylene oxide and insufficient to degrade said silver and said palladium oxide, shaping said mixture to produce a fuel cell assembly, electrochemically reducing said palladium oxide to metallic palladium in a dilute solution of an alkaline electrolyte, said alkaline electrolyte and said polyethylene oxide forming an ionically conductive gel within the pores of said electrode assembly.

11. Method of claim 10 wherein said electrode is further subjected to a water bath after the reduction of said palladium oxide to palladium to leach from said electrode said polyethylene oxide.

References Cited by the Examiner
UNITED STATES PATENTS

| | | | |
|---|---|---|---|
| 2,384,463 | 9/45 | Gunn et al. | 136—86 |
| 2,708,683 | 5/55 | Eisen | 136—20 X |
| 2,738,375 | 3/56 | Schlotter | 136—30 |
| 2,772,322 | 11/56 | Witt et al. | 136—148 X |
| 2,806,256 | 9/57 | Smith-Hohannsen | 260—2.5 X |
| 2,819,981 | 1/58 | Schornstheimer et al. | 260—2.5 X |
| 2,838,590 | 6/58 | Garine | 136—30 |
| 2,860,175 | 11/58 | Justi | 136—86 X |
| 2,902,530 | 9/59 | Eisen | 136—20 |
| 2,936,328 | 5/60 | Sillcox et al. | 136—145 |

JOHN H. MACK, *Primary Examiner.*

JOHN R. SPECK, *Examiner.*